N. H. DAVIS.
METHOD OF MAKING BRAKE SHOE REINFORCEMENTS.
APPLICATION FILED MAY 6, 1912.
1,100,175.
Patented June 16, 1914.
3 SHEETS—SHEET 1.
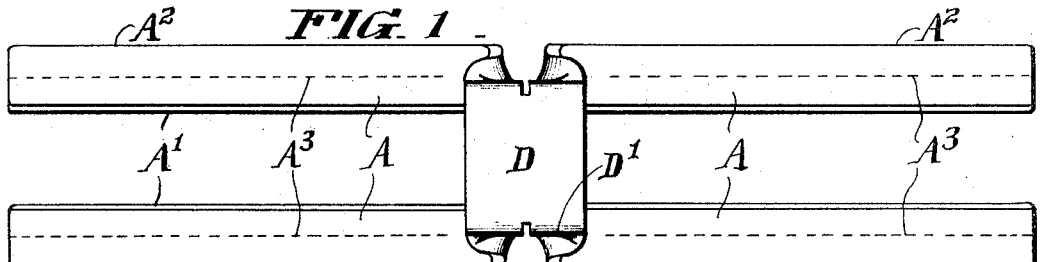
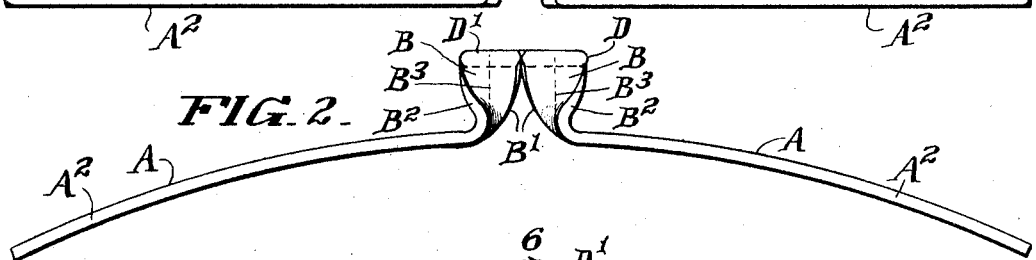
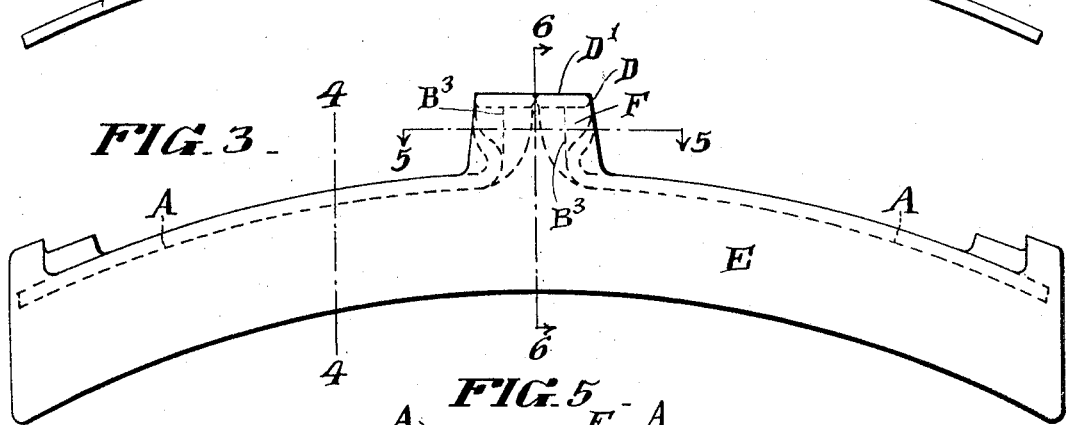
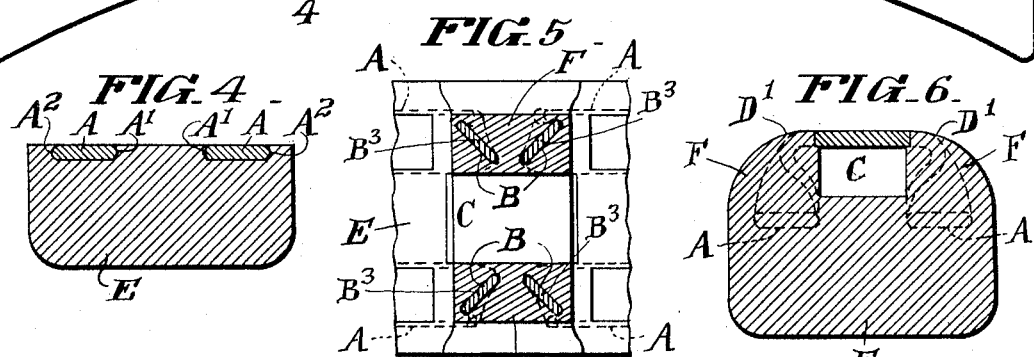
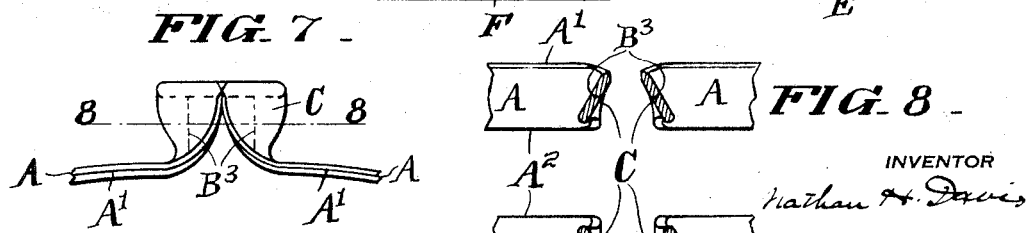
WITNESSES
INVENTOR
Nathan H. Davis
BY
ATTORNEY

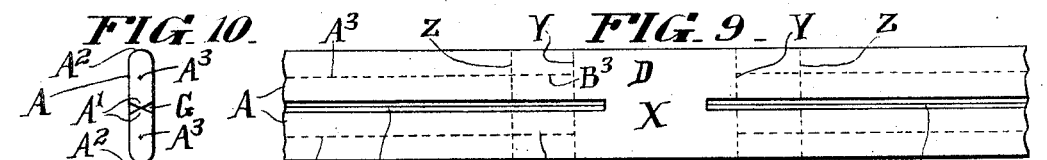
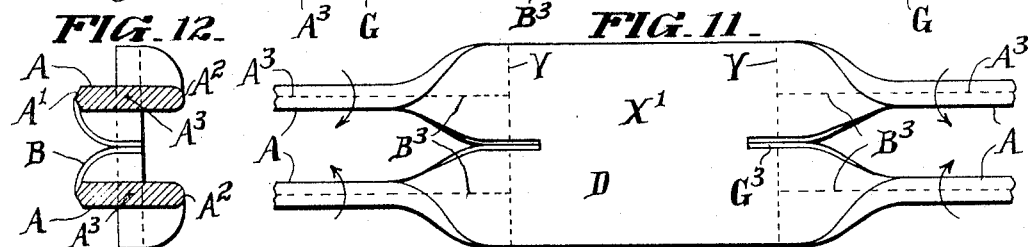
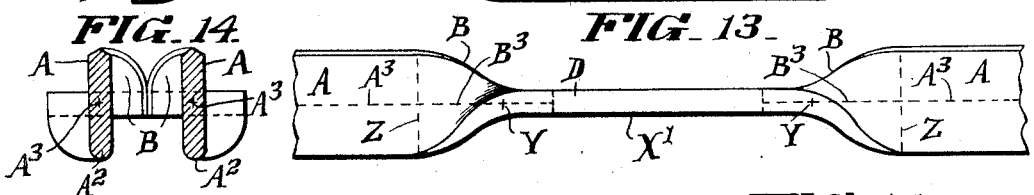
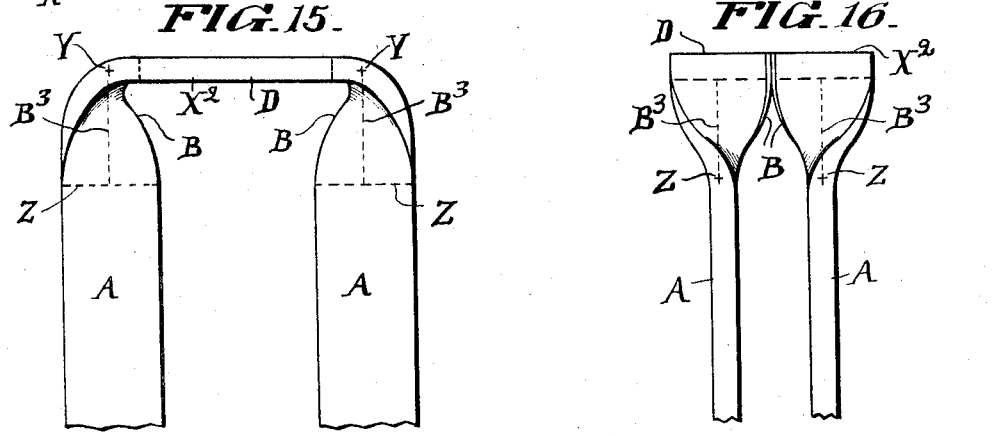
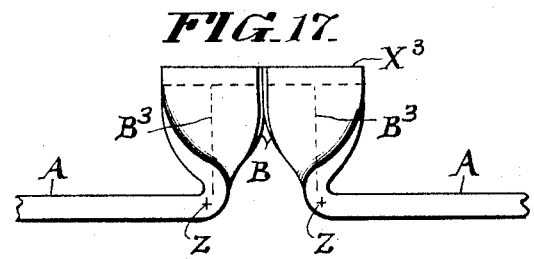
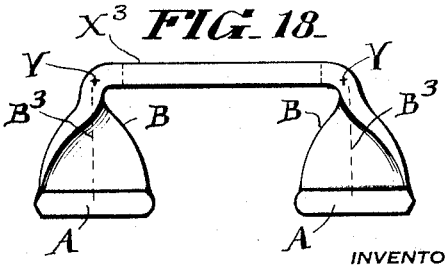

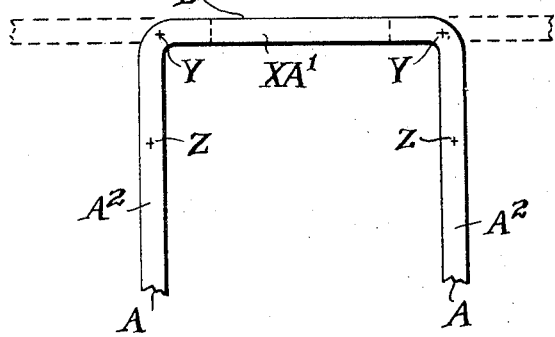
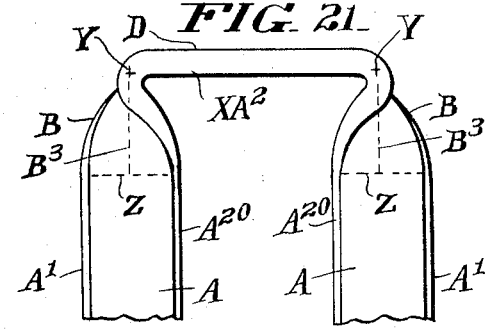
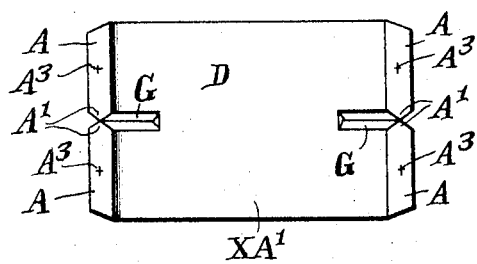
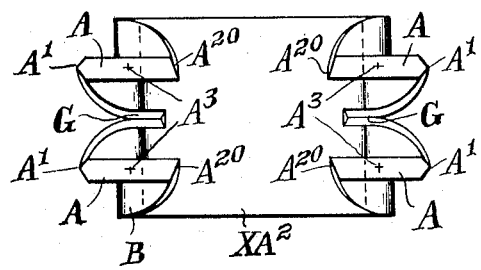
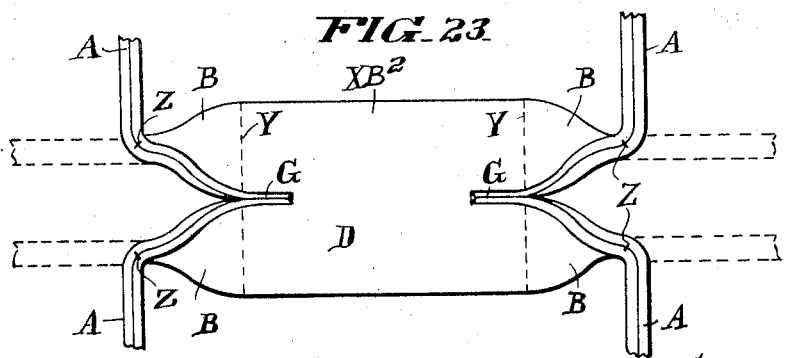
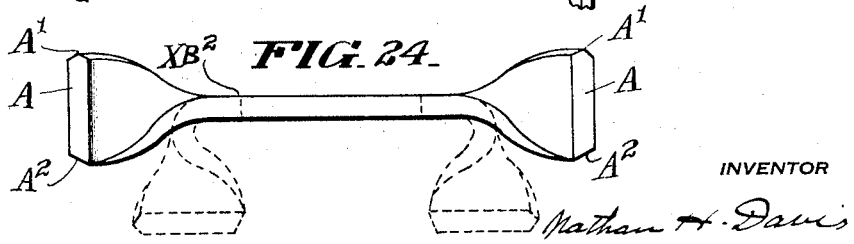

UNITED STATES PATENT OFFICE.

NATHAN H. DAVIS, OF PHILADELPHIA, PENNSYLVANIA, ASSIGNOR TO AMERICAN BRAKE SHOE & FOUNDRY COMPANY, OF MAHWAH, NEW JERSEY, A CORPORATION OF NEW JERSEY.

METHOD OF MAKING BRAKE-SHOE REINFORCEMENTS.

1,100,175.   Specification of Letters Patent.   Patented June 16, 1914.

Application filed May 6, 1912. Serial No. 695,332.

*To all whom it may concern:*

Be it known that I, NATHAN H. DAVIS, a citizen of the United States of America, residing in the city and county of Philadelphia, in the State of Pennsylvania, have invented a certain new and useful Improvement in Methods of Making Brake-Shoe Reinforcements, of which the following is a true and exact description, reference being had to the accompanying drawings, which form a part thereof.

The invention claimed herein consists in a novel method employed in making an improved form of the type of sheet metal backing adapted to be incorporated in a cast brake shoe, which is disclosed and claimed in my prior Patent 822,352, granted June 5, 1906.

The particular form of backing disclosed herein, and to make which the method claimed herein was primarily devised, while incorporating the invention of my said prior patent, differs from the particular form of backing shown in that patent in certain respects, and is claimed in my application Serial No. 770,182 filed May 31st, 1913, as a division of this application.

The method claimed herein is of value in that it forms a simple and effective mode of producing my backing, and also, in that it results in the production of the improved backing without subjecting any portion of the backing to undue stress and strain or to alternate bends in opposite directions of any portion of the backing.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described different forms of, and different modes of producing my improved backing.

Of the drawings, Figure 1 is a plan view of one form of my improved backing. Fig. 2 is a side elevation of the backing shown in Fig. 1. Fig. 3 is a side elevation of a brake shoe in which the backing of Figs. 1 and 2 is incorporated. Fig. 4 is a section on the line 4—4 of Fig. 3. Fig. 5 is a section on the line 5—5 of Fig. 3. Fig. 6 is a section on the line 6—6 of Fig. 3. Fig. 7 is a partial side elevation taken similarly to Fig. 2 but showing a slightly different form of backing from that shown in Figs. 1 and 2. Fig. 8 is a section on the lines 8—8 of Fig. 7. Fig. 9 is a plan of a preferred form of blank out of which I produce the new backing. Fig. 10 is an end elevation of the blank shown in Fig. 9. Fig. 11 is a plan view of the blank formed out of the blank of Fig. 9 by a subsequent shaping operation. Fig. 12 is an end elevation of the blank shown in Fig. 11. Fig. 13 is a side elevation of the blank shown in Fig. 12. Fig. 14 is an end elevation of the blank shown in Fig. 13. Fig. 15 is a side elevation of the blank formed out of the blank of Figs. 11–14 by a further shaping operation. Fig. 16 is an elevation taken at right angles to Fig. 15. Fig. 17 is a side elevation of the blank formed from the blank of Figs. 15 and 16 by a further shaping operation. Fig. 18 is an end elevation taken at right angles to Fig. 17. Fig. 19 is a side elevation of the blank formed out of a blank generally similar to that shown in Fig. 9 by a different shaping operation from that resulting in the blank of Fig. 11. Fig. 20 is an inverted plan of the blank shown in Fig. 19. Fig. 21 is a side elevation of a blank formed out of the blank shown in Fig. 19 by a further shaping operation. Fig. 22 is an inverted plan of the blank shown in Fig. 21, and, Fig. 23 is a plan of a blank formed out of the blank analogous to that shown in Fig. 11 by a different shaping operation from that resulting in the blank shown in Fig. 15, and, Fig. 24 is an end elevation of the blank shown in Fig. 23.

My brake shoe backing shown in the drawings consists of four arms A united to a loop or body D by curved connecting arms B, the whole being formed from a piece of sheet metal, such as the rectangular bar like blank X, shown in Figs. 9 and 10, having its ends bifurcated by the longitudinal slits G, G. The backing is secured to and incorporated in the cast metal shoe as shown clearly in Figs. 3 to 6 inclusive, in which E indicates the body of the cast metal portion of the shoe; and F F integral rearwardly extending lugs. The lugs F F in which are incorporated the arms B, extend by preference to the top or outer surface of the body D of the backing and form the side walls of the passage C. The passage C is provided to receive the key, not shown, for securing the shoe when in use to the corresponding brake head.

In so far as above described the brake shoe and backing does not differ from the disclosure of my prior patent, either in form or in the general method of securing the backing and cast metal portions of the shoe together. The new backing does differ from the backing of my prior patent however, in the form of and disposition of the curved arms B and in the cross section of the arms A, and these differences result in a difference in the manner in which the backing and the cast metal portion of the shoe are secured together.

In my present construction, as shown in Figs. 1 to 6 inclusive, the side edges D' of the backing loop body D lie in planes transverse to the backing body D and intersecting the corresponding arms A between the side edges of the latter and preferably at about their medial lines $A^3$. In a backing of this preferred shape the opposite edges B' and $B^2$ of each connecting arm B are approximately equal in length and analogous in shape, and the center line $B^3$ of each arm B is approximately straight and perpendicular to the plane of the backing body D. The arms B, therefore, extend substantially parallel to the pull exerted on the backing by the key securing the brake shoe to the brake head, and the material composing the arms B is thus well disposed to resist this pull. This not only permits of the use of practically the full tensile strength of the arms B to resist the pull to which they are subjected, but also avoids any side pull or twist from being exerted by the arms B on the arms A tending to twist the latter out of their anchorage in the brake shoe body. Moreover, the shape of the arms B makes it entirely possible to have these arms entirely incorporated in or enveloped by the cast metal extension lugs F of the body E as shown clearly in Fig. 5, the cast metal of the lugs F engaging and overlapping portions of both sides and both edges of the arms B. With this construction the lugs F may be formed with the requisite bearing surfaces at their opposite ends to prevent undesirable wear between the brake shoe and the walls of the socket in the brake head receiving the lugs and at the same time these lugs have a sufficient cross section of metal not separated from the body of the brake shoe either by the arms B incorporated in the lugs, or by the arms A to give the desired strength. It will be observed that the cast metal of the lugs extends without interruption for the full width of the lugs from the body of the brake shoe to the tops of the loop in the neighborhood of the plane of the section shown in Fig. 5. A further advantage of the improved construction is due to the fact that the arms A A are not rectangular in cross section, but are so shaped, as shown in Fig. 4, that the sockets, so to speak, formed in the cast metal body E by, and receiving these arms, are undercut. In the preferred construction illustrated this result is obtained by making the backing from a bar, as shown in Fig. 9 having rounded edges $A^2$ and by so slitting the ends of the bar at G G that the corresponding edges A' of the arms A are beveled. I may also obtain satisfactory arm edges by forming the backing from a bar of trapezoidal cross section, as is employed in the construction shown in Figs. 19 to 22 inclusive. From a practical standpoint, however, I prefer to use bars with rounded edges as such bars are usually more readily available.

In forming a backing of the kind described in accordance with the present invention there are several different modes which may be employed. In a preferred mode after first forming the blank X of the proper length and having the slits G G separating the arms A, A, and B, B, as shown in Fig. 9, I proceed to twist the portions of the bifurcations, which in the finished article form the arms B, about the medial lines $B^3$ by rotating each arm A about its medial line $A^3$ in a direction opposite to that in which the then adjacent arm A is rotated. This results in the blank X' shown in Figs. 11 to 14 inclusive. I next bend the blank X' about the lines Y as axes to bring all four bifurcations A B into parallelism with each other at one side of, and perpendicular to the body or loop D of the backing. This results in the blank $X^2$ of Figs. 15 and 16. I next bend the arms A relative to the arms B about the lines Z as axes to produce the blank $X^3$ shown in Figs. 17 and 18. The next and final step in the forming of the backing of Figs. 1 and 2 is to curve the arms A.

The method just described may be modified by bending the blank X initially about the lines Y to produce the U-shaped blank X A' of Figs. 19 and 20, and then twisting the arms B about their medial lines $B^3$ to produce the blank X $A^2$ of Figs. 21 and 22. The blank X $A^2$ may be absolutely identical with the blank $X^2$ of Figs. 15 and 16, and as shown is identical therewith, except that the initial blanks are of slightly different cross section and the twisting operation resulting in the blank $X^2$ has been carried out so that the outer edges of the arms A, as they appear in Fig. 15 and in the finished backing of Figs. 1 to 6, are the rounded edges $A^2$, and the inner edges are the beveled edges A', while in the blank X $A^2$ of Fig. 21 the outer edges of the arms A are the beveled edges A' and the inner edges are the inclined edges A²⁰. This difference between the blanks X² and X A² is not a function of the difference in the order of bending and twisting actions, but is purely a function of the difference in initial cross section and of the direction of twisting. With initial blanks of the same cross section the first described method of forming the blank would result in the blank X A² of Figs. 21 and 22, if the arms B of Fig. 11 which were twisted clockwise had been twisted in the anti-clockwise direction and the arms B which were twisted in the anti-clockwise direction had been twisted in the clockwise direction, and similarly a difference in the direction of twisting the arms of the blank X A' would result in the blank X² instead of the blank X A². The backing formed from the blank X A² by first bending the arms A about the lines Z to produce a blank generally like the blank X³ of Figs. 17 and 18 and then curving the arms A, differs from the backing of Figs. 1 and 2 in the set or twist of the arms B. In Figs. 7 and 8 I have shown a backing which differs from that formed from the blank X A² in the manner just described only in that the cross section of the blank from which the backing of Figs. 7 and 8 is formed is like that shown in Fig. 10. In Figs. 7 and 8 the twisted arms C correspond to the arms marked B in the other figures. The only practical difference which I have found between the backing of Figs. 7 and 8 and the backing of Figs. 1 and 2 is that when the arms A and B are bent relative to each other about the lines Z, there is a slight tendency of the arms A to "toe out" or to separate at their free ends in the construction shown in Figs. 7 and 8, while with the backing of Figs. 1 and 2 there is a tendency for the arms to "toe in" or come together at their free ends. In practice I have found the divergence in either case to be very small but prefer from practical reasons dependent mainly upon the character of the preferred mechanism which I have devised for making the blanks when it exists, that the tendency of the arms should be to "toe in" rather than "toe out."

Instead of forming the backing by either of the methods described above, I may, after forming a blank like the blank X' of Figs. 11 to 14 inclusive, next bend the arms A relative to the arms B about the lines Z to produce the blank X B² of Figs. 23 and 24 and then bend the arms A of blank X B² down about the lines Y as indicated in dotted lines in Fig. 24 to ultimately produce the backing of Figs. 7 and 8 or bend the arms A and B up about the lines Y to produce a blank like that shown in Figs. 17 and 18.

The three modes described are all alike in that the bending and twisting operations are so carried out that no bending or twisting operation tends to counteract or reverse the bend or set given by any preceding bending operation. This is a highly desirable and important condition for the production of a finished backing having the maximum strength consistent with the material employed and general method of manufacturing the completed article. The different modes described are all alike in that the arms B are twisted about the medial lines B³ of those arms while such medial lines are in alinement with the medial lines A³ of the corresponding arms A and this is conducive to strength in the finished brake shoe since the twisting and bending operations to which the arms B are subjected are so carried out that the maximum extension or stretching of the edges B' and B² of the arms B and the maximum compression along the medial lines B³ of the arms B are as small as can be with the production of a finished structure of the type and formed in the general mode described.

In the construction illustrated I have shown the various arms A with their lower surfaces parallel to and flush with the back face of the brake shoe in which they are incorporated, but it will be understood that this, while preferred is not an essential feature. The arms A may be entirely incorporated within the brake shoe and need not have their back surfaces parallel to the back surfaces of the brake shoe.

For the commercial production of my improved brake shoe backing I have devised mechanism for which I am about to apply for a patent and by means of which the backing may be manufactured rapidly and economically. It will be apparent to those skilled in the art, however, that the novel and advantageous method described herein for forming the backing is not a function of or dependent upon the use of any particular mechanism, and it will also be apparent to those skilled in the art that changes may be made in the particular forms of the improved method disclosed herein without departing from the spirit of my invention and that certain features of the invention disclosed herein may be used with advantage under some circumstances without a corresponding use of other features.

Having now described my invention what I claim as new and desire to secure by Letters Patent, is:

1. The method of forming a sheet metal backing for a cast brake shoe out of a blank in the form of a bar, bifurcated at its opposite ends which consists in twisting the inner end portion of each bifurcation about its axis to bring the outer portion of the bifurcation into a plane transverse to the plane of the connecting body portion of the blank and bending each bifurcation at the opposite ends of the twisted portions to set said twisted portion with its axis substantially transverse both to said body portion and to the untwisted outer portion of said bifurcation and to bring the untwisted portions of each pair of originally alined bifurcations alongside of each other.

2. The method of forming a brake shoe reinforcing back out of a bar-like blank having its end slit to provide a central body portion and bifurcated end portions, which consists in giving the inner end portion of each bifurcation a quarter twist about the axis of the bifurcations, bending the bifurcations relative to said body portion to set the twisted portion of each bifurcation substantially perpendicular to said body portion, and bending the untwisted portion of each bifurcation relative to the twisted portion to set the untwisted portion transverse to the twisted portion.

3. The method of forming a brake shoe reinforcing back out of a bar-like blank having its ends slit to provide a central body portion and bifurcated end portions, which consist in giving the inner end portion of each bifurcation a quarter twist about the axis of the bifurcation, bending the bifurcations relative to said body portion to set the twisted portion of each bifurcation substantially perpendicular to said body portion and bending the untwisted portion of each bifurcation relative to the twisted portion to set the untwisted portion transverse to the corresponding twisted portion, said twisting and bending steps being carried out in the order specified.

4. The method of forming a brake shoe reinforcing back out of a bar-like blank having its ends slit to provide a central body portion and bifurcated end portions, which consist in giving the inner end portion of each bifurcation a quarter twist about the axis of the bifurcation, bending the bifurcations relative to said body portion to set the twisted portion of each bifurcation substantially perpendicular to said body portion and bending the untwisted portion of each bifurcation relative to the twisted portion to set the untwisted portion transverse to the corresponding twisted portion, said twisting operation preceding said last mentioned bending operation.

5. The method herein described of forming a reinforcing back for brake shoes which consists in producing a blank having the form of a flat longitudinal bar bifurcated at its ends so as to form a pair of arms at each end of the bar, twisting the inner end portion of each arm about its own longitudinal axis so as to bring the outer portion of the arm into a plane transverse to the general plane of the middle portion of the blank, and bending each arm at the opposite ends of the twisted portions in order to render the axis of each said last-mentioned portions substantially transverse both to said middle portion and to the flat extending outer portion of the arm, and to bring the flat extending portions of each pair of arms alongside of each other, and in such relative positions that the longitudinal axis of each of said last-mentioned portions is in the same plane as the adjacent edges of said middle portion.

NATHAN H. DAVIS.

Witnesses:
ARNOLD KATZ,
S. STEWART.